UNITED STATES PATENT OFFICE.

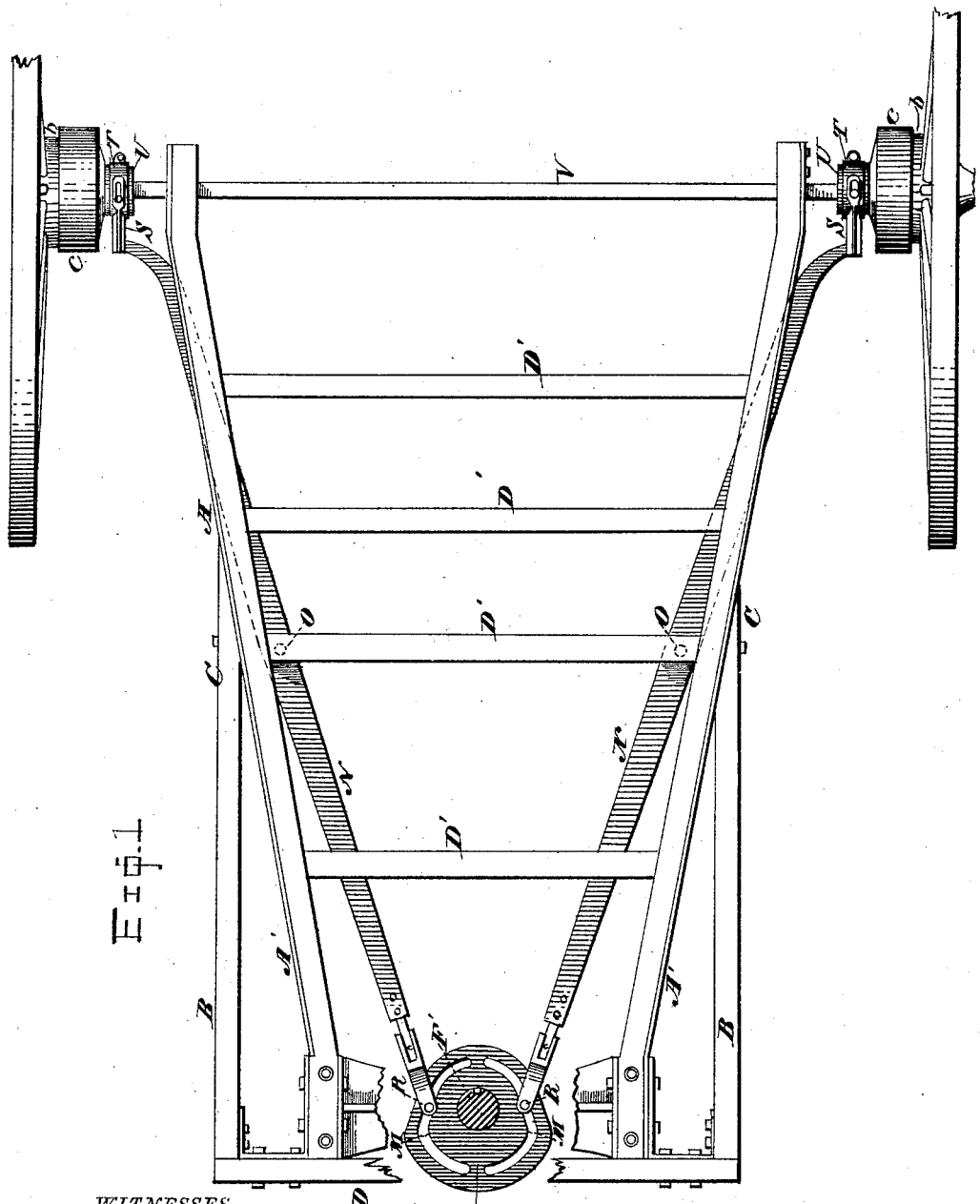

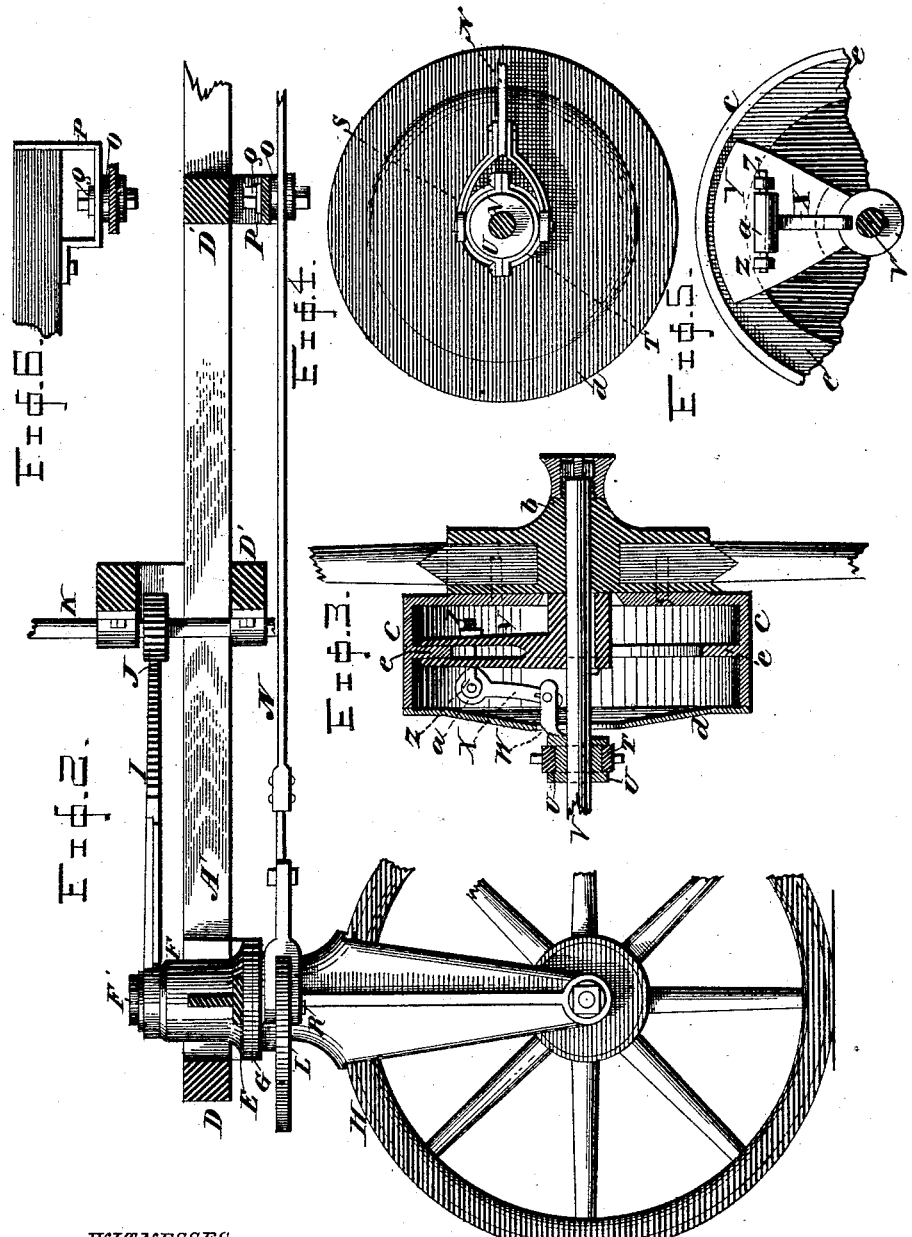

CLAYTON W. RUSSELL, OF SPRINGFIELD, OHIO.

ROAD-VEHICLE.

SPECIFICATION forming part of Letters Patent No. 354,488, dated December 14, 1886.

Application filed October 14, 1886. Serial No. 216,254. (No model.)

*To all whom it may concern:*

Be it known that I, CLAYTON W. RUSSELL, a citizen of the United States, residing at Springfield, in the county of Clark and State of Ohio, have invented certain new and useful Improvements in Self-Propelling Road-Vehicles, of which the following is a specification, reference being had therein to the accompanying drawings.

This invention relates to improvements in self-propelling road-vehicles; and it has for its objects, first, to provide mechanism for frictionally connecting the driving-shaft with the driving-wheels, whereby both of said wheels and said shaft will rotate in unison when the traveling is in a straight or approximately straight line, and whereby, upon departing from that line and traveling in a curvature or other irregular direction, the wheel which shall accomplish the greater distance shall maintain its unison movement with the shaft, while the wheel which is accomplishing the lesser distance should not rotate in said unison, but shall only be connected with the shaft so firmly as the particular speed incident to the curvature it is traveling in will admit of, the shaft itself rotating faster and the frictional connection between the two allowing of this, and yet imparting some of rotating influence to the wheel to prevent its being a dead and not a driving wheel; second, the invention has for its object to combine the frictional mechanism above mentioned with the guiding or steering mechanism by suitable intermediate appliances, whereby the degree of the strength of the connection between the driving-shaft and the respective driving-wheels is controlled by the guiding mechanism and affected by a change in the course of a vehicle from one side to the other, the arrangement also being such that when the vehicle is turned shortly round the connection between the inner wheel and the driving-shaft is entirely destroyed.

In the accompanying drawings, forming a part of this specification, and in which like reference-letters indicate corresponding features, Figure 1 represents a plan view of my improved mechanism mounted upon a suitable running-gear; Fig. 2, a partial side elevation and partial sectional view of same, with the rear portion broken off; Fig. 3, a diametrical sectional view of one of the driving-wheels and its attendant clutch mechanism; Fig. 4, an inner elevation of the clutch mechanism, showing the driving-shaft in section and a portion of one of the operating-levers; Fig. 5, an inner view of the friction-segment, and Fig. 6 a detail view of the fulcrum-support.

The letter A designates the frame of the running-gear, consisting of the beams A' A' and B B, secured together at C, and cross-beams D D'. To the beam D the beams A' A' are secured in any approved manner, and to A' A' is fastened the bolster E, constructed of metal, and having a central opening and sleeve, F, through which passes the shaft F' of the front and guiding wheel, a shoulder, G, being formed on the said shaft to support the bolster, as seen in Fig. 2. This shaft F' is bifurcated, and the front and guiding wheel, H, is mounted in the bifurcation. The shaft of this wheel carries a segmental rock-back, I, with which meshes a pinion, J, mounted on a hand-shaft, K, having an operating hand-wheel and fitted in suitable bearings secured to the frame. Thus the vehicle is guided; but these several features are not, in point of construction, material to the present invention. Secured to the guiding-shaft F' is a cam, L, of somewhat peculiar shape. The cam-slots, from a transverse line drawn through the center of the shaft toward the rear, are concentric with the center of rotation, but from said line in a forward direction to the point M each slot diverges somewhat from a concentric line, while the remaining portions of the slots are also concentric with the center of rotation and are of the same radius as the points M are distant from the center. The object in this arrangement will appear hereinafter.

The letter N indicates actuating-levers for the clutch mechanism, the same being fulcrumed to the running-gear frame at O, the frame being provided with a bracket, P, through which the fulcrum-bolts Q pass. The forward ends of the levers are provided with pins or bolts R, which fit the cam-slots, and which cause that end of the levers to acquire a movement to or from the center of the guiding-shaft, oscillating in so doing on their fulcrum-points at O, and undergoing a like movement at their rear ends. At these ends the levers are each connected—as by means of the yokes S and the two-part bands F—to the grooved sleeve U, mounted on the driving-shaft V. These sleeves are free to move or reciprocate on the shaft, so as to travel with the rear ends of the levers. The yokes S are slotted, and the bands U are provided with studs, which enter said slots, whereby a sliding but strong connection is effected. Of course any other means of connecting the sleeves and the levers may be adopted.

To projections W, extending from the sleeves, are slidingly connected eccentric levers X, while secured rigidly to the main shaft are friction-segments Y, constructed each after the fashion of jaws. Bolts Z are passed loosely through holes in the jaws, and held from displacement at one end, as by a nut, while their other ends serve as fulcrum-points for the cross-heads $a$ of the lever X. The eccentricity of each lever engages with one of the jaws more or less positively, according to the position of the lever with respect to the jaw, the purpose being to bring the jaws more or less toward each other, and to cause them to frictionally bind and hold a flange, presently to be mentioned.

The letter $b$ indicates the hubs of the driving-wheels, which are mounted to turn freely on the driving-shaft, and to each of which is rigidly secured a drum or shell, $c$, also mounted to turn freely on the shaft, and having a detachable end plate, $d$, to allow of access to the interior, and also provided with an annular flange, $e$. This flange stands between the jaws of the friction-segment, and is clamped by them in the manner already mentioned. When the guiding-wheel is running directly ahead, without material deflection to either side, the sleeves are nearest the segments and the levers X in their severest contact with one of each pair of jaws, and consequently the jaws in severest contact with the flange $e$, and therefore the driving-wheels and the driving-shaft in operating engagement. When, however, the guiding-wheel is turned in one or the other direction, as in turning a corner, one lever is moved outwardly at its front end and the other lever maintained in its normal radial position, the consequence of which is that the eccentric lever, operated by the actuating-lever, which thus received motion, is made to partially or entirely free the jaws of its segment from the flange $e$, while the other eccentric lever and the jaws of its segment have received no change of position or release of the contact with the flange $e$. As a further consequence of this, the outside wheel is still operatingly engaged with the driving-shaft, while the inside wheel is only so strongly engaged with the shaft as the degree of the curvature caused the cam L to rotate, for if the curvature is comparatively slight the contact between the jaws and the flange is but slightly released, so as to allow the segment to slip a little on the flange and travel a little faster than the wheel and flange, while if the curvature is sufficient to bring the point M of the cam L, or the slot forward of it, back to the bolt R, then the jaws would have entirely released the flange and allowed the shaft to turn without affecting the inner wheel, and allowed that wheel to act merely as a turning-point for that end of the vehicle. Respecting the motor by which my vehicle shall be propelled, I would say that I do not confine myself to any particular kind. I may use a steam-boiler and steam-engine, or a gas-engine, or, indeed, an electric motor of any of the known makes. All these, or others, are within my contemplation, yet upon none in particular have I decided or do I limit myself.

I would have it understood that I make no claim to connecting the driving-wheels to the driving-axle by clutches which effect a positive connection as distinguished from clutches which effect a frictional connection or union of those parts.

The reasons for employing frictional clutches appear in the foregoing description, while from the objects I have in view it will at once be seen that positive or toothed clutches will not answer my purpose.

Having thus fully described my invention, what I claim as new, and desire to secure by Letters Patent, is—

1. In a self-propelling road-vehicle, the combination, with the guiding-wheel and its vertical shaft, pivoted levers, and a device mounted on said shaft to which said levers are connected and by which one is moved and the other not moved by turning said shaft, of the driving-shaft, driving-wheels loosely mounted thereon, and friction-clutch mechanism constructed to connect the wheels and shaft and actuated by said levers.

2. In a self-propelling road-vehicle, the combination, with the guiding-wheel and a cam on its shaft, of the driving-shaft and the driving-wheels mounted loosely thereon and carrying a friction-flange, friction-clutches which engage said flange, and levers which actuate said clutches at one end and which are controlled by said cam at the other end, whereby when the guiding-wheel is running directly ahead both clutches equally engage the flange, and when running to either side one clutch engages while the other does not, or one engages more severely than the other.

3. In a self-propelling road-vehicle, the combination, with the steering-wheel and its shaft, and a slotted cam secured to the shaft, of the driving-shaft, the driving-wheel loosely mounted thereon and having friction-flanges, clutches mounted on the driving-shaft and constructed to frictionally engage said flange, eccentric levers which operate the clutches, sleeves which actuate the eccentric levers, and actuating-levers connected with the sleeves and in engagement with the slots in the cam, for the purpose set forth.

4. In a self-propelling vehicle, the combination, with the guiding-shaft, of a cam having slots concentric to the center of that shaft for a portion of their length, which run divergently to that curve for another portion of their length, and which again become concentric to said center for still another portion of their length, this latter portion being also of greater radius than that of the other portions.

5. In a self-propelling road-vehicle, the combination, with the driving-shaft and two driving-wheels loosely mounted thereon and having each a flange adapted to be engaged by a clutch, of friction-clutches mounted rigidly on that shaft, there being one clutch for each wheel, an eccentric lever for each clutch by which it is operated, and a sliding sleeve to which each eccentric lever is connected, mounted on said shaft.

6. In a self-propelling road-vehicle, the combination, with a driving-shaft and a driving-wheel mounted loosely thereon and having a friction-flange, of a friction-clutch mounted rigidly on the shaft and having spring-jaws, an eccentric lever pivotally mounted in bearings which draw against one of said jaws and arranged to bear against the other of said jaws, whereby when the lever is actuated it forces these jaws against that flange and unites the wheel and shaft together more or less positively, according to the movement given the lever.

7. In a self-propelling road-vehicle, the combination, with a driving-shaft and a slidingly-mounted sleeve, of a driving-wheel mounted loosely on the shaft, and a drum secured to the wheel and having an annular flange inside thereof, a segmental clutch having spring-jaws and mounted rigidly on the shaft, and an eccentric lever pivoted in eyebolts extended through said jaws, and having nuts to prevent drawing out, the said lever being also connected with the sleeve.

In testimony whereof I affix my signature in presence of two witnesses.

CLAYTON W. RUSSELL.

Witnesses:
A. A. YEATMAN,
T. P. THOMPSON.